(12) United States Patent
Uchibori

(10) Patent No.: US 11,658,521 B2
(45) Date of Patent: May 23, 2023

(54) STATOR AND MOTOR

(71) Applicant: Nidec Corporation, Kyoto (JP)

(72) Inventor: Tomoki Uchibori, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/572,673

(22) Filed: Jan. 11, 2022

(65) Prior Publication Data

US 2022/0231549 A1     Jul. 21, 2022

(30) Foreign Application Priority Data

Jan. 20, 2021   (JP) .............................. JP2021-006980

(51) Int. Cl.
| | | |
|---|---|---|
| *H02K 1/2786* | (2022.01) | |
| *H02K 1/14* | (2006.01) | |
| *H02K 37/12* | (2006.01) | |
| *H02K 1/18* | (2006.01) | |
| *H02K 1/2788* | (2022.01) | |

(52) U.S. Cl.
CPC ............. *H02K 1/145* (2013.01); *H02K 1/187* (2013.01); *H02K 1/2788* (2022.01); *H02K 37/12* (2013.01)

(58) Field of Classification Search
CPC ...... H02K 1/145; H02K 1/187; H02K 1/2788; H02K 37/12
See application file for complete search history.

(56) References Cited

U.S. PATENT DOCUMENTS

2009/0284100 A1* 11/2009 Huang .................. H02K 5/225
                                                          310/257

FOREIGN PATENT DOCUMENTS

JP          2000-350431 A     12/2000

* cited by examiner

*Primary Examiner* — Ramon M Barrera
(74) *Attorney, Agent, or Firm* — Keating & Bennett

(57) ABSTRACT

A stator includes a first sleeve extending in an axial direction and a first stator core on an outer periphery of the first sleeve. The first stator core includes a lower core and an upper core on a side of the lower core opposed to a first end of the axial direction. The lower core includes a lower annular portion with an annular shape and lower pole teeth protruding radially outward from a radially outer end surface of the lower annular portion and extending to a second end of the axial direction. The upper core includes an upper annular portion with an annular shape arranged on the lower annular portion opposed to the first end of the axial direction to overlap the lower annular portion, and upper pole teeth protruding radially outward from a radially outer end surface of the upper annular portion and extending to the second end of the axial direction. Each of the lower pole teeth and each of the upper pole teeth are alternately arranged in the circumferential direction.

8 Claims, 6 Drawing Sheets

[Fig. 1]
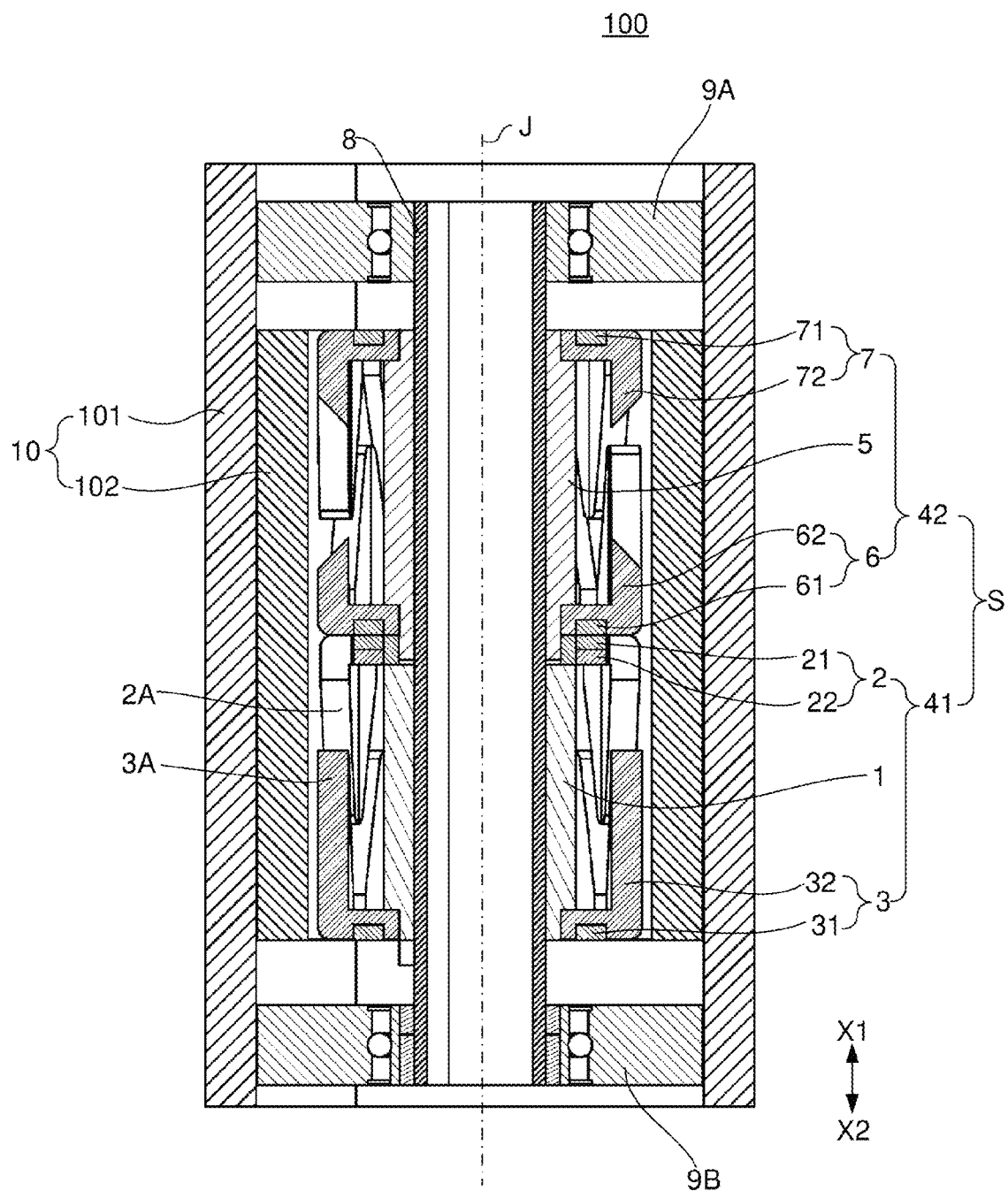

[Fig.2]
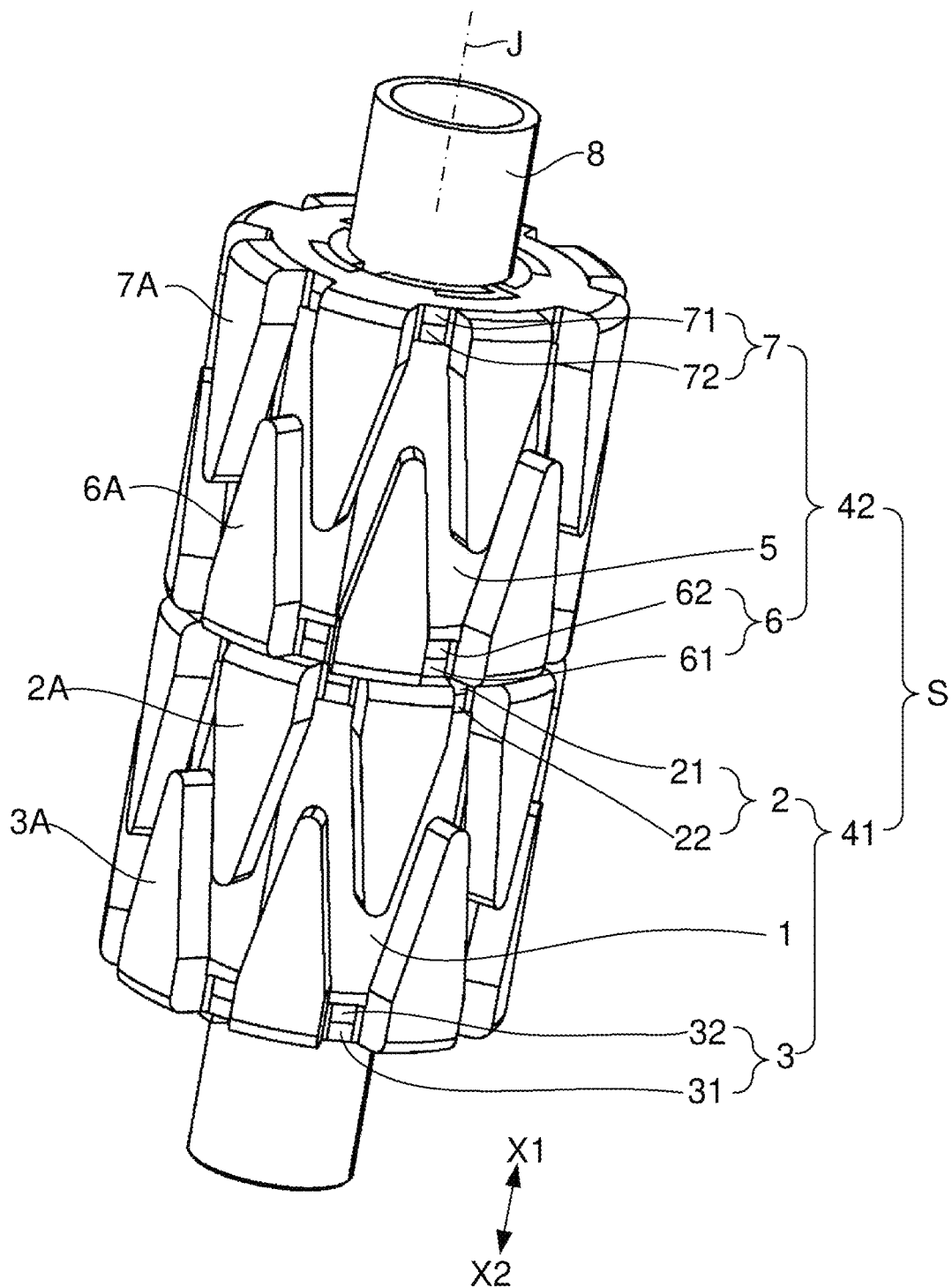

[Fig.3]
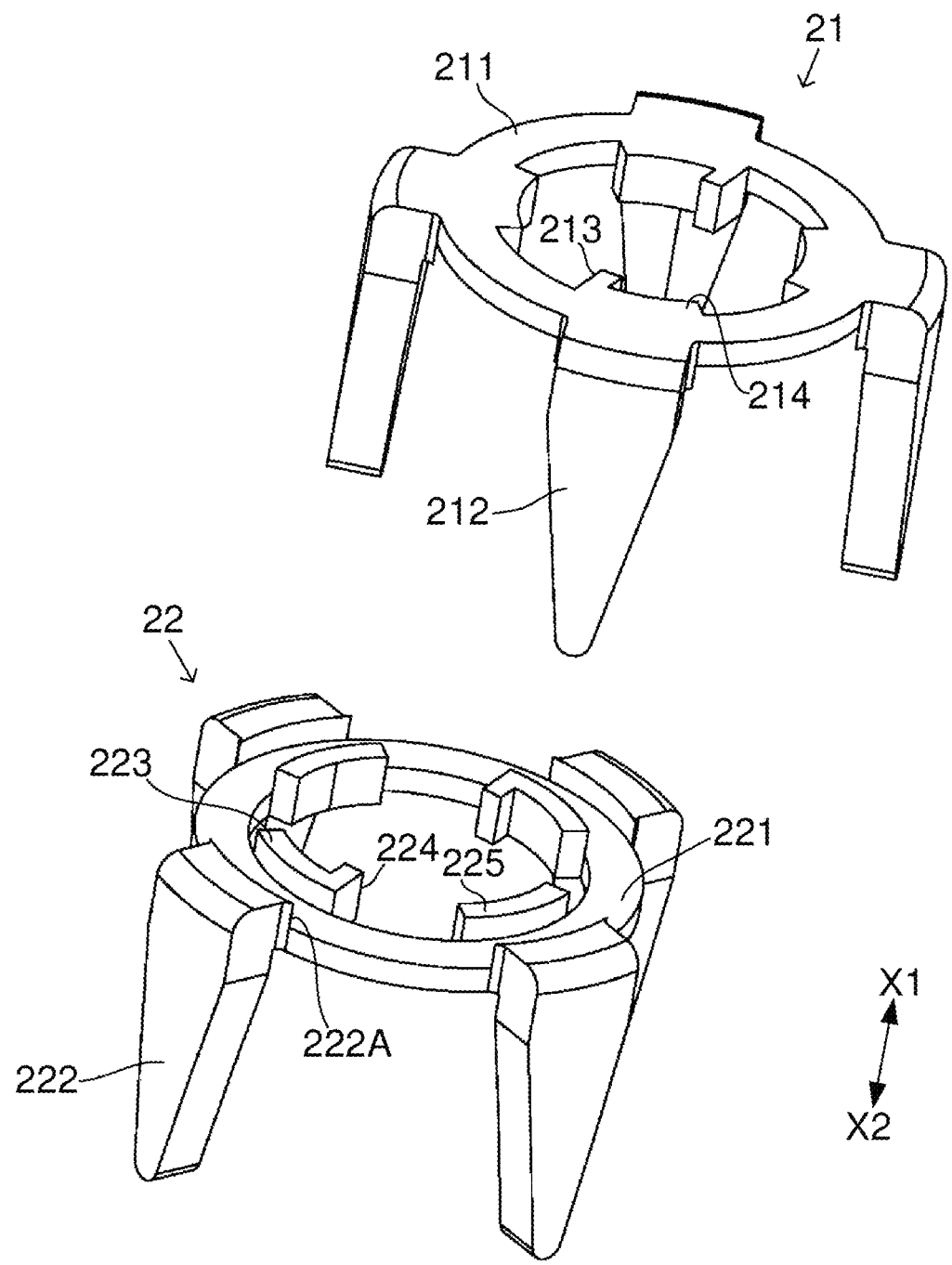

[Fig.4]
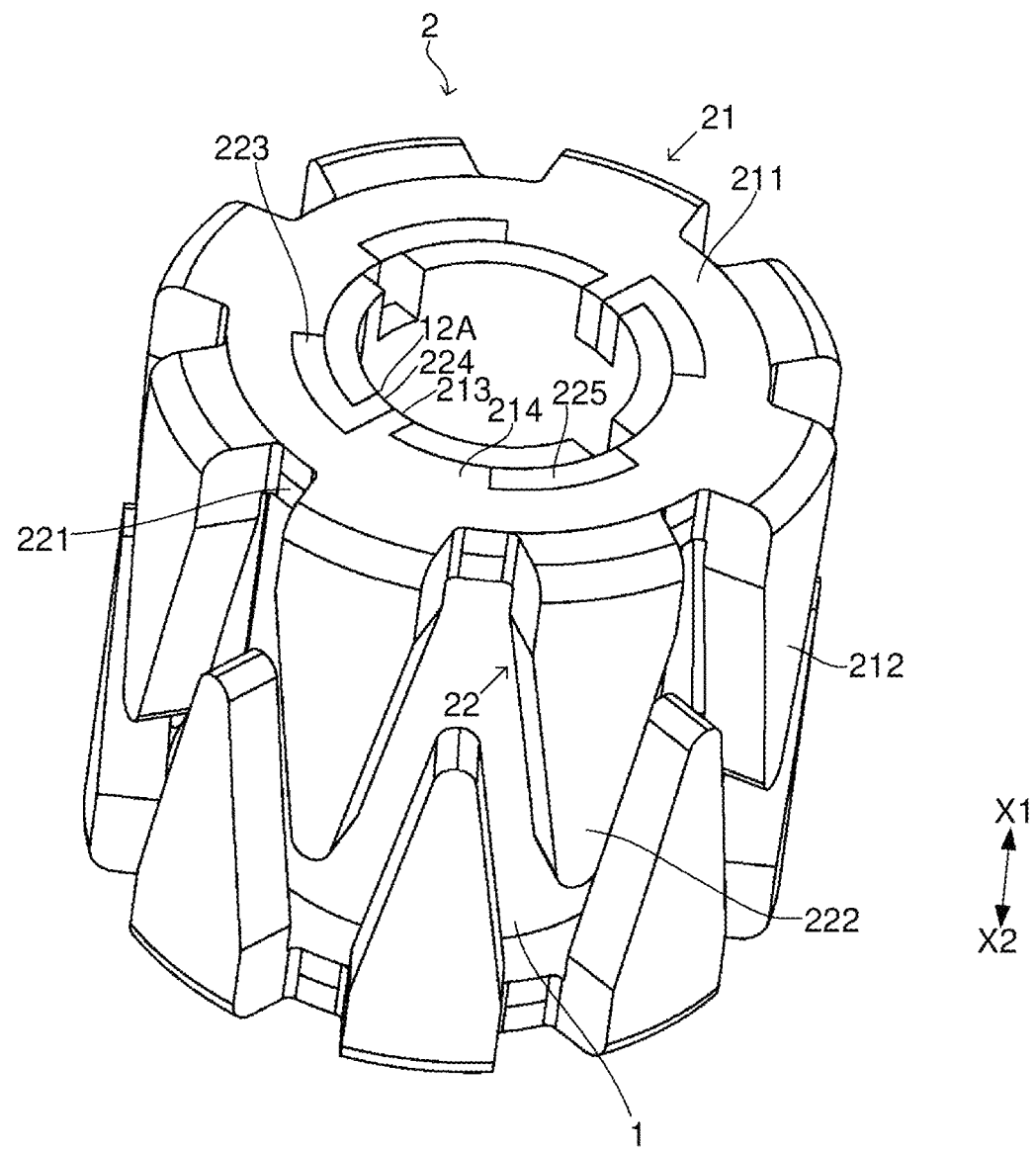

[Fig.5]
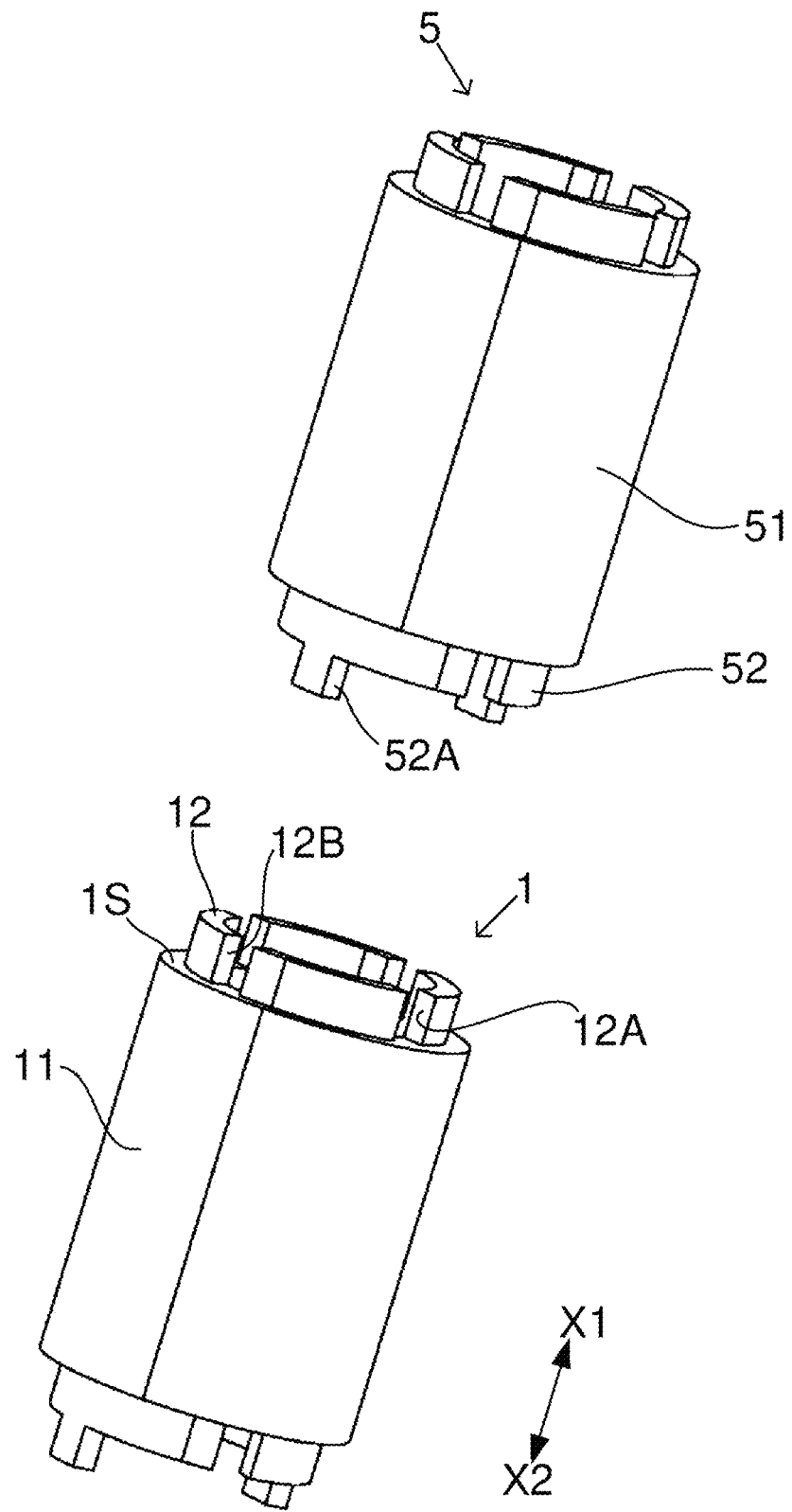

【Fig.6】
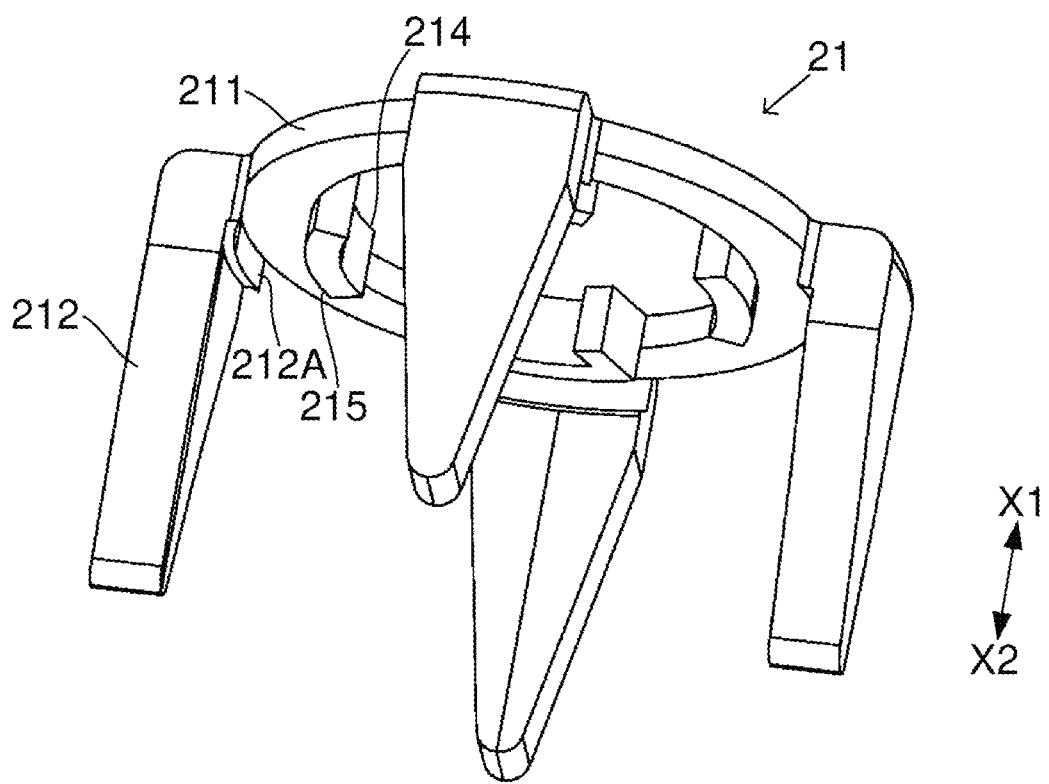

STATOR AND MOTOR

CROSS-REFERENCE TO RELATED APPLICATIONS

The present application claims priority under 35 U.S.C. § 119 to Japanese Patent Application 2021-006980, filed on Jan. 20, 2021, the entire contents of which are hereby incorporated herein by reference.

FIELD OF THE INVENTION

The present disclosure relates to a stator used in a stepping motor.

BACKGROUND

Conventionally, a stepping motor includes a motor called a claw-pole motor. The claw-pole motor has a stator. The stator includes a stator core. The stator core has a plurality of claw-shaped pole teeth (claw poles) arranged in the circumferential direction.

In the claw-pole motor as described above, it is desirable to increase the number of pole teeth in order to improve a motor characteristic. When a stator core is manufactured, pole teeth are formed by bending processing. In a state where the stator core is completed, the stator core includes pole teeth and an annular portion that supports the pole teeth. However, when the number of pole teeth is increased as described above, a large stress is applied to the annular portion at the time of bending processing, and there has been a possibility that distortion occurs in the annular portion.

SUMMARY

A stator according to an example embodiment of the present disclosure includes a first sleeve extending in an axial direction, and a first stator core on an outer periphery of the first sleeve. The first stator core includes a lower core and an upper core on a side of the lower core opposing a first end of the axial direction. The lower core includes a lower annular portion with an annular shape and lower pole teeth protruding radially outward from a radially outer end surface of the lower annular portion and extending to a second end of the axial direction. The upper core includes an upper annular portion with an annular shape on a side of the upper core opposing the first end of the axial direction of the lower annular portion to overlap the lower annular portion, and upper pole teeth protruding radially outward from a radially outer end surface of the upper annular portion and extending to the second end of the axial direction. Each of the lower pole teeth and each of the upper pole teeth are alternately arranged in a circumferential direction.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 1 is a longitudinal cross-sectional view of a motor according to an example embodiment of the present disclosure.

FIG. 2 is a perspective view illustrating a configuration in which a stator and a shaft according to an example embodiment of the present disclosure are combined.

FIG. 3 is an exploded perspective view of a stator core according to an example embodiment of the present disclosure in an exploded state.

FIG. 4 is a perspective view of a configuration including the stator core.

FIG. 5 is a perspective view illustrating configurations of a first sleeve and a second sleeve according to an example embodiment of the present disclosure.

FIG. 6 is a perspective view of an upper core according to an example embodiment of the present disclosure as viewed from below.

DETAILED DESCRIPTION

Example embodiments of the present disclosure will be described with reference to the drawings.

In the present description, regarding a motor 100, the direction parallel to a central axis J of the motor 100 is referred to as the "axial direction". Note that, in the drawings, the "first side in the axial direction" is denoted by X1 and the "second side in the axial direction" is denoted by X2. Further, in the motor 100, the direction around the central axis J is referred to as the "circumferential direction". In the motor 100, the radial direction with respect to the central axis J is simply referred to as the "radial direction", the direction approaching the central axis J is referred to as the "radially inward", and the direction away from the central axis J is referred to as the "radially outward". The first side in the axial direction corresponds to the "upper side", and the second side in the axial direction corresponds to the "lower side". However, the terms "upper" and "lower" as used herein do not limit the direction of the motor 100 when the motor 100 is mounted on a device.

Further, since a central axis of a stator S described later coincides with the central axis J of the motor 100, reference to directions for the stator S is the same as the above.

FIG. 1 is a longitudinal cross-sectional view of the motor 100 according to an example embodiment of the present disclosure. Further, FIG. 2 is a perspective view of a configuration in which the stator S and a shaft 8 are combined.

The motor 100 is a claw-pole stepping motor and also is an outer rotor motor. The motor 100 includes the stator S, the shaft 8, bearings 9A and 9B, and a rotor 10. Note that the present disclosure may be applied to an inner rotor motor.

The shaft 8 is a cylindrical member extending in the axial direction about the central axis J.

The stator S includes a first stator assembly 41 and a second stator assembly 42. The first stator assembly 41 and the second stator assembly 42 are stacked in the axial direction. The first stator assembly 41 is arranged on the second side in the axial direction of the second stator assembly 42.

The first stator assembly 41 includes a first sleeve 1, stator cores 2 and 3, and a winding (not illustrated). That is, the stator S includes the first sleeve 1 and the stator core 2.

The first sleeve 1 is a cylindrical member extending in the axial direction about the central axis J. The first sleeve 1 is composed of a magnetic material. A radially inner peripheral surface of the first sleeve 1 is arranged radially outside a radially outer peripheral surface of the shaft 8. The first sleeve 1 is fixed to the outer periphery of the shaft 8.

The stator core 2 is fixed to an end portion on the first side in the axial direction of the first sleeve 1. The stator core 2 is arranged on the outer periphery of the first sleeve 1. The stator core 2 includes an upper core 21 and a lower core 22. The upper core 21 is arranged on the first side in the axial direction of the lower core 22. The stator core 2 has a plurality of claw-shaped pole teeth 2A arranged in the circumferential direction. The pole teeth 2A extend toward the second side in the axial direction.

The stator core 3 is fixed to an end portion on the second side in the axial direction of the first sleeve 1. The stator core 3 includes a lower core 31 and an upper core 32. The upper core 32 is arranged on the first side in the axial direction of the lower core 31. The stator core 3 has a plurality of claw-shaped pole teeth 3A arranged in the circumferential direction. The pole teeth 3A extend toward the first side in the axial direction. The pole teeth 2A and the pole teeth 3A are alternately arranged in the circumferential direction.

The winding is wound around the outer periphery of the first sleeve 1 between the stator core 2 and the stator core 3 in the axial direction. The winding faces the pole teeth 2A and 3A in the radial direction on the radially inner side of the pole teeth 2A and 3A.

The second stator assembly 42 includes a second sleeve 5, stator cores 6 and 7, and a winding (not illustrated). The second sleeve 5 is arranged on the first side in the axial direction of the first sleeve 1. The stator core 6 is fixed to an end portion on the second side in the axial direction of the second sleeve 5. That is, the stator core 6 is fixed to the second sleeve 5. The stator core 6 includes a lower core 61 and an upper core 62. The stator core 6 has a plurality of pole teeth 6A. The pole teeth 6A extend toward the first side in the axial direction. The stator core 7 is fixed to an end portion on the first side in the axial direction of the second sleeve 5. The stator core 7 includes an upper core 71 and a lower core 72. The stator core 7 has a plurality of pole teeth 7A. The pole teeth 7A extend toward the second side in the axial direction. Since the basic configuration of the second stator assembly 42 is similar to that of the first stator assembly 41, detailed description is omitted.

The bearing 9A is fixed to the outer periphery of the shaft 8 on the first side in the axial direction of the second stator assembly 42. The bearing 9A is a ball bearing. The bearing 9B is fixed to the outer periphery of the shaft 8 on the second side in the axial direction of the first stator assembly 41. The bearing 9B is a ball bearing.

The rotor 10 has a housing 101 and a magnet 102. The housing 101 has a cylindrical shape extending in the axial direction about the central axis J. An end portion on the first side in the axial direction of a radially inner peripheral surface of the housing 101 is fixed to an outer peripheral surface of the bearing 9A. An end portion on the second side in the axial direction of a radially inner peripheral surface of the housing 101 is fixed to an outer peripheral surface of the bearing 9B.

The magnet 102 has a cylindrical shape extending in the axial direction about the central axis J. The magnet 102 is a permanent magnet, and is composed of, for example, a ferrite magnet. The magnet 102 is fixed to a radially inner peripheral surface of the housing 101. The magnet 102 is arranged between the bearing 9A and the bearing 9B in the axial direction. The magnet 102 radially faces the first stator assembly 41 radially outside the first stator assembly 41, and radially faces the second stator assembly 42 radially outside the second stator assembly 42.

As the windings are energized, in each of the stator core units 41 and 42, a plurality of the pole teeth (2A and 3A and 6A and 7A) arranged in the circumferential direction as viewed in the axial direction are alternately magnetized in the circumferential direction by the N pole and the S pole.

The rotor 10 rotates in the circumferential direction by the action of the pole teeth magnetized in this way and the magnet 102.

The configuration of the stator core will be described in detail. Here, the stator core 2 will be representatively described. FIG. 3 is an exploded perspective view illustrating the stator core 2 disassembled into the upper core 21 and the lower core 22. FIG. 4 is a perspective view of a configuration including the stator core 2. That is, FIG. 4 is a diagram illustrating a state in which the upper core 21 and the lower core 22 are combined.

The lower core 22 has a lower annular portion 221 having an annular shape. The lower core 22 has a plurality of lower pole teeth 222 arranged at equal intervals in the circumferential direction. Here, the number of the lower pole teeth 222 is, for example, four. The lower pole teeth 222 extend to the second side in the axial direction while protruding radially outward from a radially outer end surface of the lower annular portion 221.

The upper core 21 has an upper annular portion 211 having an annular shape. The upper core 21 has a plurality of upper pole teeth 212 arranged at equal intervals in the circumferential direction. Here, the number of the upper pole teeth 212 is, for example, four. The upper pole teeth 212 extend to the second side in the axial direction while protruding radially outward from a radially outer end surface of the upper annular portion 211.

The upper annular portion 211 is arranged on the first side in the axial direction of the lower annular portion 221 so as to overlap the lower annular portion 221. In a state where the upper annular portion 211 and the lower annular portion 221 overlap each other, each of a plurality of the lower pole teeth 222 and each of a plurality of the upper pole teeth 212 are alternately arranged in the circumferential direction (FIG. 4). The lower pole teeth 222 and the upper pole teeth 212 are not necessarily arranged alternately in the circumferential direction.

The stator core 2 including the upper core 21 and the lower core 22 includes the pole teeth 2A (FIG. 2) including the lower pole teeth 222 and the upper pole teeth 212. Even in a case where the number of the pole teeth 2A (here, eight) is increased, the number of pole teeth (here, four) for each core of the upper core 21 and the lower core 22 can be suppressed. Therefore, a stress applied to the annular portion by bending processing at the time of manufacturing each core is suppressed, and the occurrence of distortion in the annular portion can be suppressed.

As illustrated in FIG. 5, the first sleeve 1 includes a cylindrical large-diameter portion 11 and a cylindrical small-diameter portion 12. The small-diameter portion 12 is arranged on the first side in the axial direction of the large-diameter portion 11. The small-diameter portion 12 has an outside diameter smaller than an outside diameter of the large-diameter portion 11. An inside diameter of the large-diameter portion 11 and an inside diameter of the small-diameter portion 12 are the same. A placement surface 1S is formed at a boundary between the large-diameter portion 11 and the small-diameter portion 12. The placement surface 1S is an annular surface perpendicular to the central axis J. When the lower annular portion 221 is placed on the placement surface 1S, the stator core 2 is supported by the first sleeve 1.

The magnet 102 (FIG. 1) radially faces a plurality of the lower pole teeth 222 and a plurality of the upper pole teeth 212 radially outside a plurality of the lower pole teeth 222 and a plurality of the upper pole teeth 212.

Characteristic configurations of the upper core 21 and the lower core 22 will be further described. The lower core 22 has a first protruding wall portion 223 protruding from an end on the first side in the axial direction of a radially inner peripheral surface of the lower annular portion 221 to the first side in the axial direction. The lower pole teeth 222 have a second protruding wall portion 222A protruding from an end on the first side in the axial direction of a radially outer peripheral surface of the lower annular portion 221 to the first side in the axial direction. The first protruding wall portion 223 and the second protruding wall portion 222A face each other in the radial direction. The upper annular portion 211 is in contact with a radially outer peripheral surface of the first protruding wall portion 223 and a radially inner peripheral surface of the second protruding wall portion 222A. In this manner, the upper annular portion 211 can be radially positioned with respect to the lower annular portion 221. Note that, as illustrated in FIG. 3, in the lower core 22 according to the present example embodiment, two sets of the first protruding wall portion 223 and the second protruding wall portion 222A are provided to face each other in the radial direction with the central axis J between them.

The lower core 22 has a lower inner protruding portion 224 protruding radially inward from a radially inner peripheral surface of the lower annular portion 221. The upper core 21 has an upper inner protruding portion 213 protruding radially inward from a radially inner peripheral surface of the upper annular portion 211. In the first sleeve 1, a first notch portion 12A is provided on the small-diameter portion 12 (FIG. 5). That is, the first sleeve 1 has the first notch portion 12A. The first notch portion 12A is notched from an end surface on the first side in the axial direction of the first sleeve 1 to the second side in the axial direction. In a state where the upper core 21 and the lower core 22 are combined, the lower inner protruding portion 224 and the upper inner protruding portion 213 are arranged in the first notch portion 12A (FIG. 4).

In this manner, positioning in the circumferential direction of the upper core 21 and the lower core 22 with respect to the first sleeve 1 can be performed. The lower inner protruding portion 224 and the upper inner protruding portion 213 may be arranged in different notch portions. That is, at least one of the first notch portion only needs to be provided.

However, as in the present example embodiment illustrated in FIG. 4, the lower inner protruding portion 224 and the upper inner protruding portion 213 are preferably arranged in one of the first notch portion 12A in a manner adjacent to each other in the circumferential direction. In this manner, the number of notch portions can be reduced, and the first sleeve 1 can be easily manufactured.

The lower core 22 has a first protruding wall portion 225 arranged at an interval from the first protruding wall portion 223 in the circumferential direction. Similarly to the first protruding wall portion 223, the first protruding wall portion 225 protrudes to the first side in the axial direction from an end on the first side in the axial direction of a radially inner peripheral surface of the lower annular portion 221. That is, the lower core 22 has at least two of the first protruding wall portions 223 and 225.

Similarly to the first protruding wall portion 223, the first protruding wall portion 225 faces the second protruding wall portion 222A of the lower pole teeth 222 in the radial direction. The upper annular portion 211 is in contact with a radially outer peripheral surface of the first protruding wall portion 225 and a radially inner peripheral surface of the second protruding wall portion 222A. Therefore, the upper annular portion 211 is also positioned in the radial direction by the first protruding wall portion 225 and the second protruding wall portion 222A. As illustrated in FIG. 3, in the lower core 22 according to the present example embodiment, two sets of the first protruding wall portion 225 and the second protruding wall portion 222A are provided to face each other in the radial direction with the central axis J between them.

In contrast, the upper core 21 has a radial protruding portion 214 protruding radially inward from a radially inner peripheral surface of the upper annular portion 211. In a state where the upper core 21 and the lower core 22 are combined, the radial protruding portion 214 is arranged between two of the first protruding wall portions 223 and 225 adjacent to each other (FIG. 4).

In this manner, positioning in the circumferential direction of the upper core 21 with respect to the lower core 22 can be performed. As illustrated in FIG. 3, the radial protruding portion 214 faces the upper pole teeth 212 in the radial direction. The radial protruding portion 214 is arranged in a manner facing each of a plurality of the upper pole teeth 212 in the radial direction. That is, the number of the radial protruding portions 214 provided is equal to the number of the upper pole teeth 212.

As illustrated in FIG. 6, the upper pole teeth 212 have a third protruding wall portion 212A protruding from an end on the second side in the axial direction of a radially outer peripheral surface of the upper annular portion 211 toward the second side in the axial direction. The upper core 21 has a fourth protruding wall portion 215 protruding from an end on the second side in the axial direction of the radial protruding portion 214 toward the second side in the axial direction. The third protruding wall portion 212A and the fourth protruding wall portion 215 face each other in the radial direction. In a state where the upper core 21 and the lower core 22 are combined, the lower annular portion 221 contacts a radially inner peripheral surface of the third protruding wall portion 212A and a radially outer peripheral surface of the fourth protruding wall portion 215.

In this manner, positioning in the radial direction of the upper core 21 with respect to the lower core 22 can be performed.

As illustrated in FIG. 5, the first sleeve 1 has a second notch portion 12B. The second notch portion 12B is provided in the small-diameter portion 12. The second notch portion 12B is different in circumferential position from the first notch portion 12A, and is notched from an end surface on the first side in the axial direction of the first sleeve 1 to the second side in the axial direction.

The second sleeve 5 includes a large-diameter portion 51 and a small-diameter portion 52 arranged on the second side in the axial direction of the large-diameter portion 51. The small-diameter portion 52 is provided with a protruding piece 52A. That is, the second sleeve 5 has the protruding piece 52A. The protruding piece 52A protrudes from an end surface on the second side in the axial direction of the second sleeve 5 toward the second side in the axial direction.

The protruding piece 52A is arranged in the second notch portion 12B. Note that two of the protruding pieces 52A and the second notch portions 12B are provided to face each other with the central axis J between them. Each of the protruding pieces 52A is arranged in each of the second notch portions 12B. In this manner, the first sleeve 1 and the second sleeve 5 are connected. Further, positioning of the second sleeve 5 in the circumferential direction with respect to the first sleeve 1 is performed. That is, the stator core 6 can be positioned in the circumferential direction with respect to the stator core 2.

The present disclosure can be used for stepping motors used in various devices.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A stator comprising:
a first sleeve extending in an axial direction; and
a first stator core on an outer periphery of the first sleeve; wherein
the first stator core includes:
a lower core; and
an upper core on a side of the lower core opposing a first end of the axial direction;
the lower core includes:
a lower annular portion with an annular shape; and
lower pole teeth that protrude radially outward from a radially outer end surface of the lower annular portion and extend to a second end of the axial direction;
the upper core includes:
an upper annular portion with an annular shape on a side of the lower annular portion opposing the first end of the axial direction to overlap the lower annular portion; and
upper pole teeth that protrude radially outward from a radially outer end surface of the upper annular portion and extend to the second end of the axial direction; and
each of the lower pole teeth and each of the upper pole teeth are alternately arranged in a circumferential direction.

2. The stator according to claim 1, wherein
the lower core includes a first protruding wall portion protruding from an end of a radially inner peripheral surface of the lower annular portion opposing the first end of the axial direction to the first end of the axial direction;
the lower pole teeth include a second protruding wall portion protruding from an end of a radially outer peripheral surface of the lower annular portion opposing the first end of the axial direction to the first end of the axial direction;
the first protruding wall portion and the second protruding wall portion oppose each other in the radial direction; and
the upper annular portion is in contact with a radially outer peripheral surface of the first protruding wall portion and a radially inner peripheral surface of the second protruding wall portion.

3. The stator according to claim 1, wherein
the lower core includes a lower inner protruding portion protruding radially inward from a radially inner peripheral surface of the lower annular portion;
the upper core includes an upper inner protruding portion protruding radially inward from a radially inner peripheral surface of the upper annular portion;
the first sleeve includes at least one first notch portion notched from an end surface of the first sleeve opposing the first end of the axial direction toward the second end of the axial direction; and
the lower inner protruding portion and the upper inner protruding portion are in the at least one first notch portion.

4. The stator according to claim 3, wherein
the lower inner protruding portion and the upper inner protruding portion are in one of the at least one first notch portions in a manner adjacent to each other in the circumferential direction.

5. The stator according to claim 3, further comprising:
a stator assembly including a second sleeve on the first sleeve opposed to the first end of the axial direction, and a second stator core fixed to the second sleeve; wherein
the first sleeve includes a second notch portion that is different in circumferential position from the first notch portion and is notched from an end surface of the first sleeve opposed to the first end of the axial direction toward the second end of the axial direction; and
the second sleeve includes a protruding piece that protrudes from an end surface of the second sleeve opposed to the second end of the axial direction to the second end of the axial direction and is in the second notch portion.

6. The stator according to claim 1, wherein
the lower core includes at least two first protruding wall portions protruding from an end of a radially inner peripheral surface of the lower annular portion opposed to the first end of the axial direction to the first end of the axial direction;
the upper core includes a radial protruding portion protruding radially inward from a radially inner peripheral surface of the upper annular portion; and
the radial protruding portion is between two of the first protruding wall portions adjacent to each other.

7. The stator according to claim 6, wherein
the upper pole teeth include a third protruding wall portion protruding from an end of a radially outer peripheral surface of the upper annular portion opposed to the second end of the axial direction toward the second end of the axial direction;
the upper core includes a fourth protruding wall portion protruding from an end surface of the radial protruding portion opposed to the second end of the axial direction toward the second end of the axial direction;
the third protruding wall portion and the fourth protruding wall portion oppose each other in the radial direction; and
the lower annular portion is in contact with a radially inner peripheral surface of the third protruding wall portion and a radially outer peripheral surface of the fourth protruding wall portion.

8. A motor comprising:
the stator according to claim 1; and
a rotor including a magnet opposing the lower pole teeth and the upper pole teeth in the radial direction radially outside the lower pole teeth and the upper pole teeth.

* * * * *